United States Patent [19]

Puschner

[11] Patent Number: 4,525,621
[45] Date of Patent: Jun. 25, 1985

[54] ELECTRONIC WELDING ENERGY SOURCE

[76] Inventor: Peter Puschner, Vaalserquartier, Gut Fuchstal Dreiländerweg 127, 5100 Aachen, Fed. Rep. of Germany

[21] Appl. No.: 455,010

[22] Filed: Jan. 3, 1983

[30] Foreign Application Priority Data

Jan. 5, 1982 [DE] Fed. Rep. of Germany ....... 3200086

[51] Int. Cl.³ .............................................. B23K 9/10
[52] U.S. Cl. .......................... 219/137 PS; 219/130.33; 219/130.51
[58] Field of Search ...................... 219/130.33, 130.32, 219/130.31, 130.21, 130.51

[56] References Cited

U.S. PATENT DOCUMENTS 3,792,225  2/1974  Needham et al. .............. 219/130.21
3,912,980 10/1975  Crump et al. .................. 219/130.33
3,928,746 12/1975  Ericsson ......................... 219/130.33
3,961,154  6/1976  Ericsson ......................... 219/130.33
4,201,906  5/1980  Puschner ........................ 219/130.33
4,320,282  3/1982  McDonald et al. ............ 219/130.33
4,349,720  9/1982  Mäkimaa ........................ 219/130.33

FOREIGN PATENT DOCUMENTS 55-97825  7/1980  Japan ............................. 219/130.33

Primary Examiner—Clifford C. Shaw
Attorney, Agent, or Firm—Kinzer, Plyer, Dorn & McEachran

[57] ABSTRACT

An electronic welding energy source comprises interconnected control and power circuits together with independently operable circuits for setting the static and dynamic characteristics respectively of the source.

6 Claims, 9 Drawing Figures

ELECTRONIC WELDING ENERGY SOURCE

This invention is concerned with an electronic welding energy source.

Welding energy sources are known which can be altered in their static characteristics, in stages or continuously, by means of transductors or thyristors. It is a disadvantage of these devices that the dynamic characteristics are determined by individual elements as a result of the construction and cannot be changed during the course of the process or during different phases of the process. Often a change in the static characteristics leads unintentionally to a change in the dynamic characteristics.

The static characteristics of a welding energy source can be represented in the static voltage-current diagram (U-I diagram). They can be determined in the static case of operation that is to say with constant load conditions. The dynamic characteristic can be represented either in diagrams of voltage against time ($u=f(t)$) and current against time ($i=f(t)$) or as voltage against current and evaluated in time ($u(t)=f(i(t))$) as working point movements.

Both static and dynamic behaviour affect the characteristics of a welding energy source and hence the welding process. Often the source behaviour is not optimum for a specific process. As a result of the mutual interference between the static and dynamic characteristics, a correspondingly irregular course of the process which cannot be optimized results.

It is an object of the present invention to obviate or mitigate these difficulties.

The present invention is an electronic welding energy source for arc welding, in that neither the static nor the dynamic characteristics is preset for a controllable power current source by means of an electronic switching network.

In an embodiment of the invention, the characteristics of the source are determined by electronic switching networks which are adjusted by adjustable potentiometers, resistance networks which can be programmed digitally or analogue voltages. Furthermore, the electronic switching networks can process signals from the outside, for example by process computers or generators, and which are derived, for example from the welding process. The latter include, for example, arc current and arc voltage, welding voltage or terminal voltage of the electronic welding energy source.

The electronic welding energy source according to the embodiments of the invention is distinguished by individual modules which, individually or in combination, take over functions realised by electronic switching networks. For an understanding of the invention, the following four function modules may be defined (see FIG. 1 of the drawings).

(1) Control module
(2) Static module
(3) Dynamic module
(4) Power module.

It is immaterial for the invention whether, in any embodiment, the electronic components are present concretely in this module form or whether a purality of module functions are realised in one operational part by suitable circuit construction. The latter is actually desirable with a view to reducing the expenditure on circuitry. Likewise, it is not necessary to provide all the function modules.

One of the module functions may be carried out wholly or partially by the computer and a corresponding computer program.

It is a feature of embodiments of the invention that the power module has no characteristics adapted to the welding process as is the case, for example, in conventional welding energy sources as a result of chokes in the welding current circuit or as a result of the construction of the transformer, for example with defined stray inductances. It is likewise important that process conditions to which the electronic welding energy source should react in a specific way are dealt with by measuring voltage and/or current of the welding process, which, for the sake of simplicity, can be done directly at the welding-current terminals of the source, and processing in electronic units such as the static and/or dynamic module. The result of this processing is then used to control the module. This technique is particularly advantageous in arc welding processes which suffer from short-circuiting and in MIG (gas metal arc, 100% inert gas) or MAG (gas metal arc with e.g. $CO_2$) pulse arc welding.

The electronic welding energy source according to embodiments of the invention is not restricted to the simple presence of the four modules previously mentioned. Instead, individual modules may be duplicated in order to allow the source to react differently to different process requirements. Thus the source according to the invention may be equipped, for example, with different dynamic modules which are activated electronically depending on the short circuit duration, for example, of a $CO_2$ process. The static and dynamic modules may likewise have a differentiating action, for example, in that they detect and evaluate the change in direction of voltage or current of the welding process.

An embodiment of the present invention will now be described, by way of example, with reference to the accompanying drawings, in which.

Figure 1:
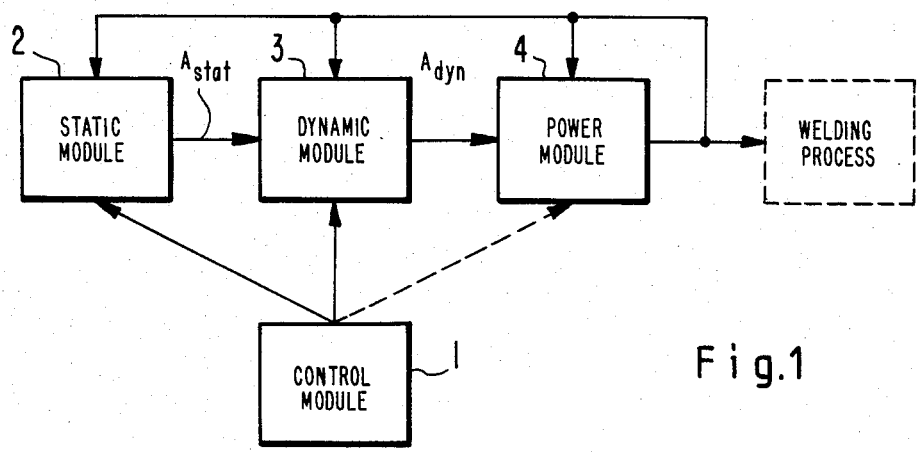
FIG. 1 is an overall block diagram of a welding energy source according to the present invention.
Figure 6:
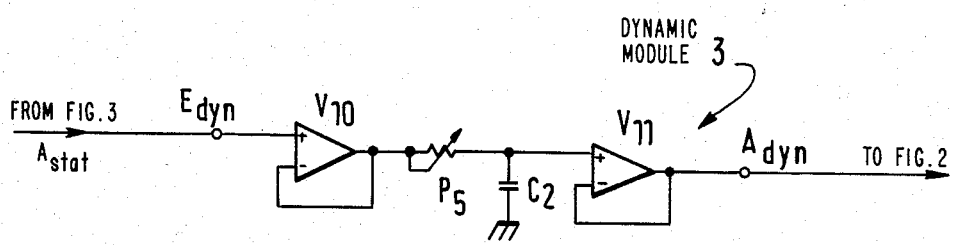
Figure 7:
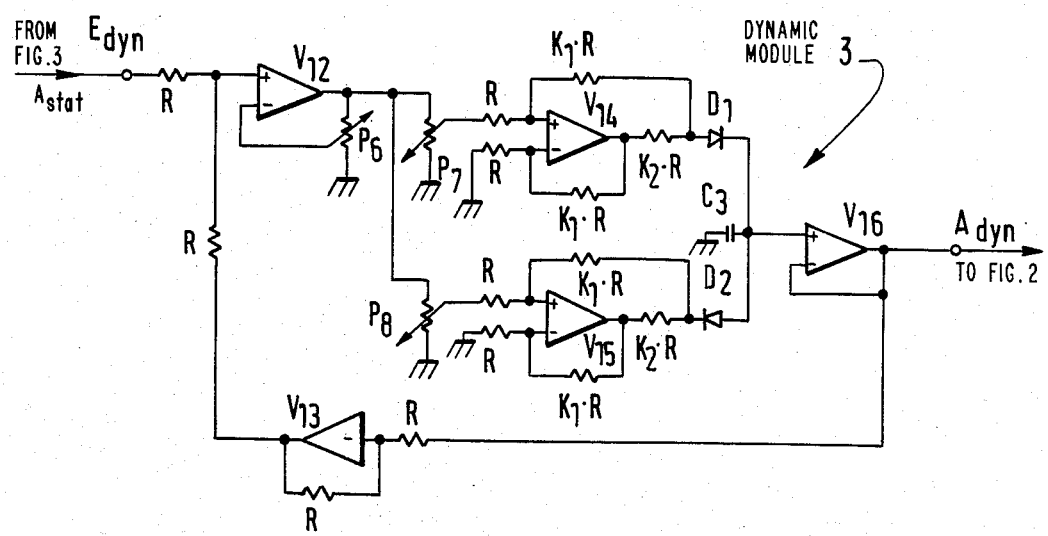

FIGS. 6 and 7 each show an embodiment of a dynamic module of FIG. 1; and

Figure 8:
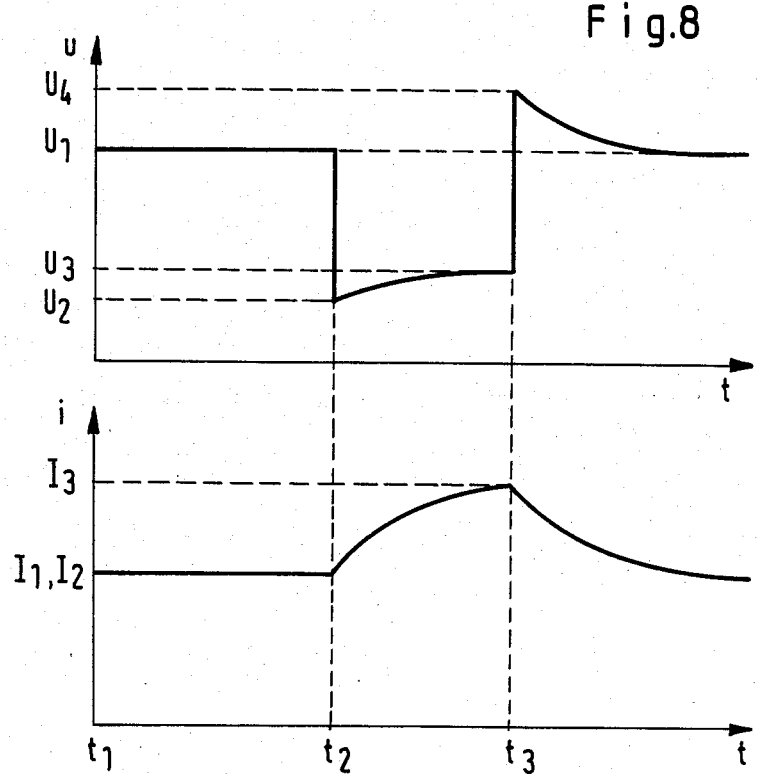
Figure 9:
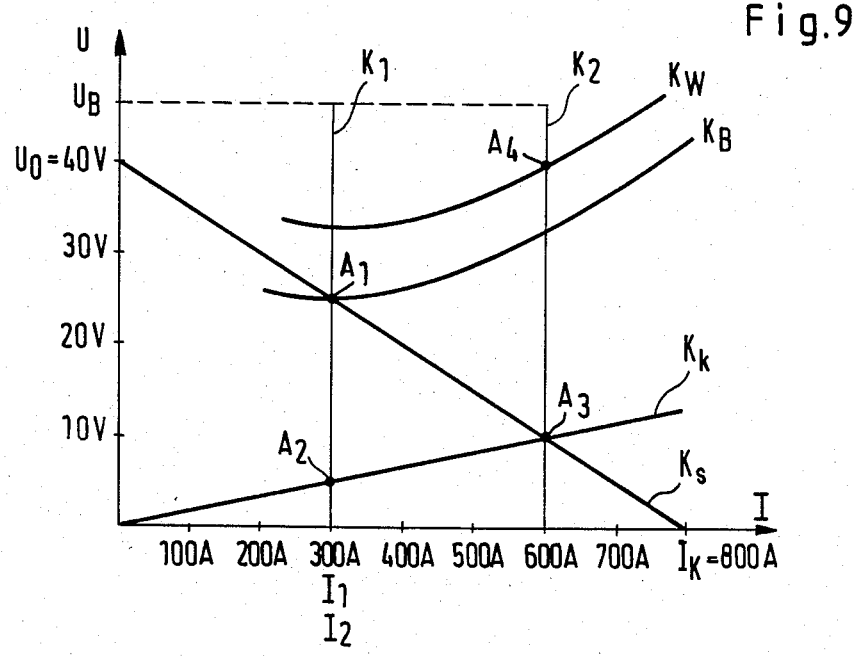

FIGS. 8 and 9 are graphs showing the source reference to a short circuit.

The embodiments described can be used preferably for shielded-arc and submerged-arc welding with a transfer of material with or without short-circuiting and for MIG or MAG pulse arc welding.

A component of the welding energy source according to the invention is an electronic power unit or module whih is constructed either on the basis of a controlled amplifier (chopper) or an amplifier working in an analogue manner. Controlled amplifiers can be constructed with thyristors or transistors according to the present state of the art, while analogue amplifiers can only be constructed with transistors. The power unit should advantageously have a frequency characteristic from 0 to a few $KH_z$, in the ideal case from 0 to a few $MH_z$ with a constant transmission behaviour. At present analogue amplifiers working can be constructed with output currents up to 2000 A with a limiting frequency in the range of 100 $KH_z$ to 500 $KH_z$. By way of example, the variant working in the analogue manner will be used as the starting point for the power module.

Figure 2:
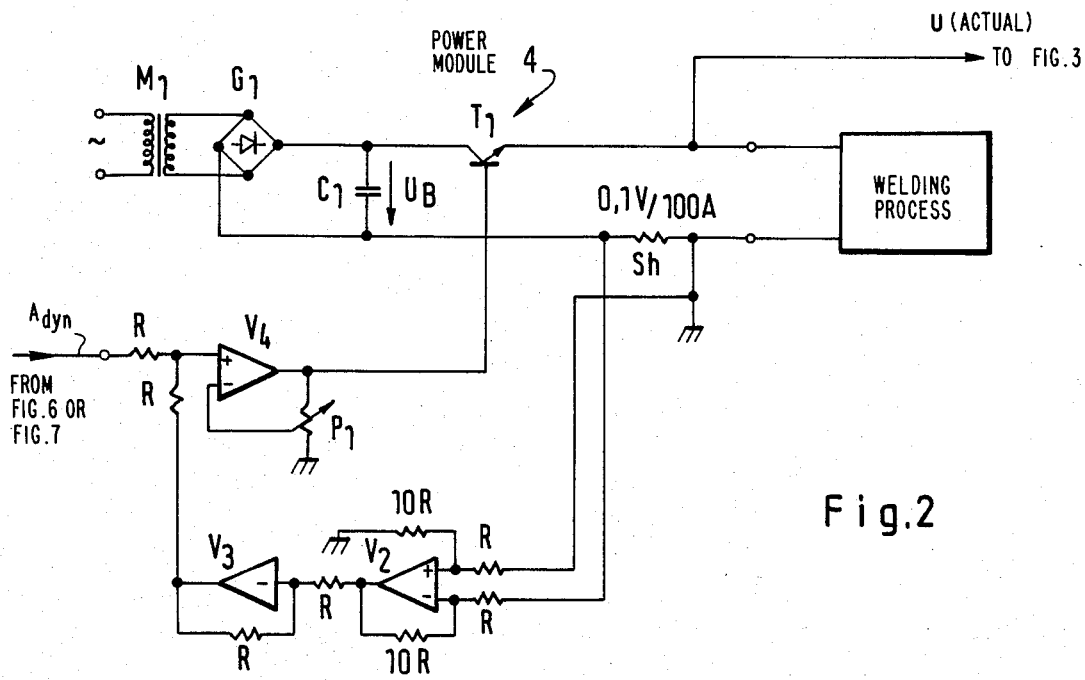
FIG. 2 is a detailed circuit diagram of a power module of FIG. 1.

As seen in FIG. 2 transformer M1 charges a capacitor C1 through a rectifier G1, the series connection of capacitor C1, series transistor T1 and welding process representing the secondary circuit or welding current circuit. The purpose of the transformer M1 is to keep the capacitor C1 as far as possible at a constant operating voltage $U_B$. This operating voltage $U_B$ is preferably slightly higher than the highest voltage to be delivered to the welding process. The base of the series transistor $T_1$, which may possibly consist of the parallel connection of some 10-100 ordinary commercial power transistors each with a power dissipation of 100 to 250 W and corresponding driver transistors, may advantageously be controlled by an amplifier $V_4$ in such a manner that an electronically controllable constant current source of high power results for driving the required welding process. For this purpose, the actual current is measured, preferably via a shunt Sh and corresponding amplifier V2, and after passing through an inverter V3 and comparison with a desired-current signal is supplied to a regulator V4. The output of the regulator V4 controls the power transistor in the welding current circuit. The regulator V4 is preferably designed as a proportional regulator with a high amplification. With infinite amplification the current characteristic curve produced of such a power unit in the U-I diagram is absolutely vertical. Thus $I\neq f(u)$. The current characteristic curve is limited upwards by the capacitor voltage. For the practical embodiment, amplification factors of the regulator V4, which can be adjusted by potentiometer P1, from 100-1000 may be regarded as adequate with a standardisation of 1 V $\triangleq$ 100 A. The power module is controlled at the terminal designated by $i_{soll}$. For the sake of clarity, only a single-phase transformer M1 with a bridge rectifier G1 is shown. Naturally, polyphase transformers or rectifiers which may also be thyristor-controlled, may also be used here. For special applications, M1 and G1 may even be replaced by a battery with an appropriate capacity.

Figure 3:
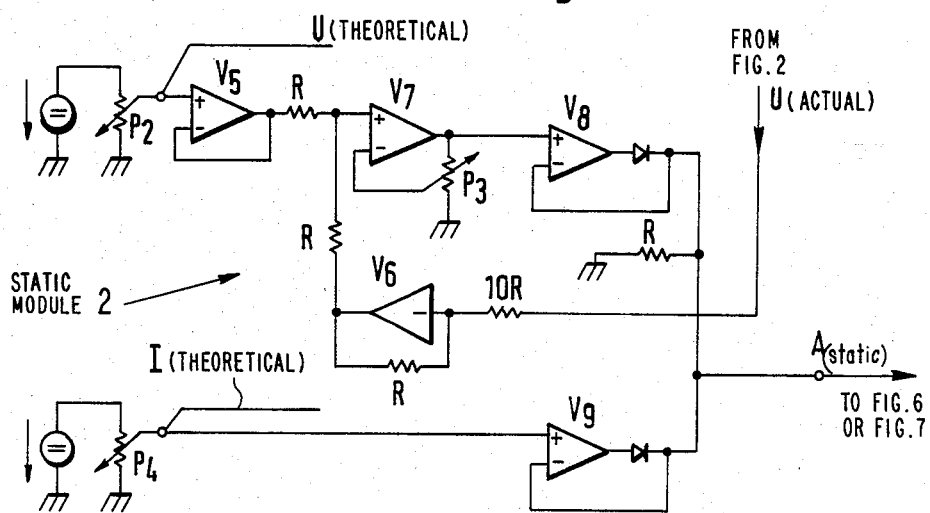
FIG. 3 is a detailed circuit diagram of a static module of FIG. 1.
Figure 4:
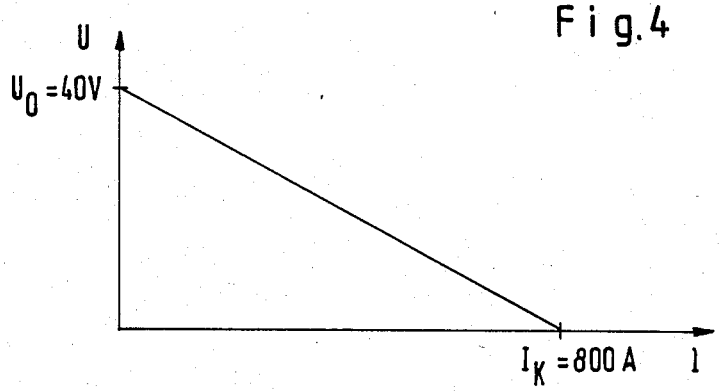
FIGS. 4 and 5 are graphs illustrating the characteristic of FIG. 3.

Connected to the input $i_{soll}$ of the power module is the output $A_{dyn}$ of the dynamic module. The input $E_{dyn}$ of this module is connected to the output $A_{stat}$ of the static module (FIG. 3). A control loop with the regulator V7 serves to produce a static characteristic curve with an adjustable slope. For this purpose, the standardized no-load voltage value is preset by the guide module at the input "desired value U", for example with potentiometer P2. Preferably 1 V $\triangleq$ 10 V (guide voltage to terminal voltage of the source) is selected as standardisation. The $U_{ist}$ signal is inverted by the amplifier V6, standardized and supplied together with the "desired value U" signal from V5 to the variable-gain amplifier V7 with amplification adjustable through potentiometer P3. The regulator output of V7 is supplied via V8, which like V9 is wired as an ideal diode, to the output terminal of the static module $A_{stat}$. The amplification of V7 and hence the slope of the characteristic curve of the source can be adjusted by P3 of the guide module. For desired value U=4 V and amplification of V7 double, a characteristic curve (FIG. 4) is obtained with $U_0=40$ V and $I_k=800$ A.

Figure 5:
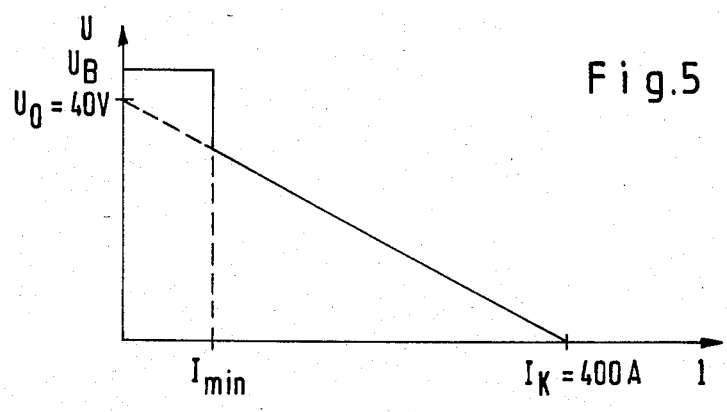

A minimum current can be preset via the ideal diode V9 and desired value I which is preset through potentiometer P4 of the guide module (FIG. 5). Thus the output of the static module $A_{stat}$ cannot become 0, as a result of which a current is offered to the arc under all conditions and serves to maintain the ionization.

FIG. 6 shows a simple dynamic module with its input $E_{dyn}$ and the output $A_{dyn}$. It contains two buffer amplifiers V10 and V11 and an adjustable R-C network consisting of P5 and C2. P5 is a component of the control module. In operation, the welding energy source behaves as if there were a choke in the welding current circuit. This choke action can also be altered during the welding by altering the resistance value of P5.

FIG. 7 shows another advantageous embodiment of the dynamic module. The variable-gain amplifier V12, the amplification of which is adjustable via P6 of the guide module, compares the input signal and via inverter V13 the output signal of this dynamic module, amplifies the control deviation resulting from the comparison and control, through two potentiometers P7 and P8 of the control module, two amplifiers V14 and V15 which are connected as controllable constant current sources and which respectively charge and discharge a capacitor C3 through oppositely poled diodes D1 and D2. V16 serves as a buffer amplifier with a high input resistance and delivers the output signal $A_{dyn}$.

If the amplification of $V_{12}$ is made equal to 1 by means of potentiometer P6 and P7 is adjusted=P8, then the module acts as an RC network similar to FIG. 6. The time constant is adjusted by the divider ratio determined by P7 and P8. The transient response with an abrupt change in input signal is an e-function.

If the amplification of V12 is adjusted towards infinity by means of P6, a ramp function results, the output signals of V16 against time being straight lines which are either horizontal (for $U_A=U_E$) or rise (for $U_E>UA$) or fall (for $U_E>U_A$), the slope being adjustable by means of P7 and P8. If the divider ratio of P7 is selected different from the divider ratio of P8, then rise and fall movements of different speeds result. This applies to all adjustable amplifications of V12. Naturally all intermediate values of P6 are possible.

The current characteristic curve of the power module and hence the current of the welding process varies according to the output signal of the dynamic module.

The course of a complete operation, with reference to FIGS. 8 and 9, for a short-circuit cycle during MAG welding under $CO_2$ will be explained. The starting point is an arc burning steadily with its characteristic curve $K_B$ and with the voltage $U_1$ and the current $I_1$. If a voltage of 4 V is preset via P2 and the amplification of V7 is selected equal to 2, then with the above-mentioned standardization values, a static characteristic curve $K_s$ results with $U_0=40$ V and $I_K=800$ A (FIG. 9). The working point A1 resulting through $U_1$ and $I_1$ is determined by the static characteristic curve and the process resistance. If this state is present sufficiently long before t1, then $E_{dyn}=A_{dyn}$ applies for the dynamic module, that is to say input signal equal to output signal. Thus the power module is controlled by a constant signal and supplies the current characteristic curve K1 with the current $I_1$ (FIG. 9).

If a short-circuit occurs in the process at the moment t2, then first the difference between "desired value U" and $u_{ist}$ will alter abruptly at the input of V7 because the process working point has been displaced from A1 to A2 along the static characteristic curve K1 of the power module. The process characteristic curve is assumed to be $K_k$ during the short-circuit bridge. It is here assumed to be constant for the duration of the short circuit by way of simplification. If, before the moment $t_2: E_{dyn} = A_{dyn}$ applied, then after $t_2: E_{dyn} > A_{dyn}$. If the amplification of V12 is selected equal to 1, then the output of V12, which before t2 was equal to 0, will assume a positive value, namely $(E_{dyn} - A_{dyn}) \times 1$ at the time t2 and will activate the constant current source V14 which charges the capacitor C3 through D1. During the charging, the output signal is reduced by the feedback signal via V13 and so the current of the constant current source V14 is reduced. The voltage at C3 rises more slowly. It thus assumes the course of an e-function and controls the power module through the output of V16. As a result the current of the welding process rises exponentially. The current characteristic curve is displaced from K1 to K2. Since the short-circuit characteristic of the process is assumed to be constant, the working point is displaced along $K_k$ from A2 to A3. The latter is described by $U_3$ and $I_3$ (FIG. 8, FIG. 9). As a result of physical effects, the short-circuit bridge is destroyed at the moment t3 and the arc is re-struck. The process resistance rises abruptly. Since K2 of the power module is still acting, the output voltage of the power module increases abruptly from $U_3$ to $U_4$ and the working point is displaced from A3 to A4. The process characteristic curve is assumed to be $K_w$ for the moment of re-striking of the arc. Immediately after t3, the static module receives the voltage report $U_4$ via V6 and establishes the fact that this voltage value lies outside the static characteristic curve $K_s$ laid down. For $U_4 < U_0$ a small positive value is set at the output of V7, for $U_4 > U_0$ a negative value. This leads to the abrupt reduction of $E_{dyn}$. Since $U_4$ can also become greater than $U_0$ depending on the process characteristic curve $K_w$, and so the output of V7 can become negative, a minimum value can be preset through P4 so that $E_{dyn}$ remains positive in every case, so that the arc remains stable even under extreme conditions. Since $E_{dyn}$ is now $< A_{dyn}$, current source V15 is activated and discharges C3 as a result of which the current characteristic curve K2 of the power module is again displaced towards lower current values until the stationary working point A1, defined by $K_1$ and $K_s$ as well as $K_B$ of the burned arc is again reached. With the varying arc conditions, the instantaneous process characteristic curve $K_w$ alters continuously during the shift back from A4 to A1, from $K_w$ to $K_B$. Both the source and the process effect a shift of characteristic curve.

Different positions of the potentiometers P7 and P8 of the guide module lead to different time constants for current rise and fall (FIG. 8). The procedure shows that the movements of the working point resulting during dynamic process phases do not have to lie on the static characteristic curve $K_s$. The static module detects, however, whether the instantaneous working point lies above or below the defined characteristic curve $K_s$ and delivers corresponding signals to control the dynamic module. This then tries to restore the instantaneous working point to the static characteristic curve $K_s$ via an adjustable time behaviour.

A further advantageous construction of the electronic welding energy source according to the invention is obtained if, for example, instead of the static input signal supplied by the guide module with potentiometer P2, a pulse generator with adjustable pulse height, pulse duration and pulse frequency is connected to the input of V5 (desired value U). A source controlled in such a manner is particularly suitable for MIG and MAG pulse welding, the so-called basic current being adjusted via desired value I.

For a pulse process under mixed gas with 82% Ar and 18% $CO_2$ with 1.2 mm wire electrode, the pulse height is selected, for example at 38 V (standardized 3.8 V) and a pulse time of 2 ms for example is selected. If, after termination of the pulse, the input signal of V5 is not switched back to 0 but to a value slightly below the minimum burning voltage of the arc, then the static module additionally acts as a detector which, on quenching of the arc through short-circuit bridges between electrode and molten pool or workpiece, automatically, through appropriate control of the dynamic module, releases a pulse with a current rise until the short-circuit bridge has opened and the arc has been re-struck. This a stabilization of the process is achieved such as was not hitherto possible.

Another advantageous construction is obtained if the desired value U is made 0 and the source is controlled only via the input desired value I. Thus a source is obtained for WIG, plasma and rod electrode welding. If a pulse or function generator is connected to the input of V9 instead of P4 of the guide module, then a source is obtained with a pulse or current program and adjustable ramp and flank times.

In a particularly advantageous embodiment of the welding energy source according to the invention, the two inputs of the amplifiers V5 and V9 are controlled by analogue outputs of a computer. All the potentiometers P3, P6, P7, P8 and possibly P1 and P5 of the guide module are replaced by programmable resistance networks and controlled by digital outputs of the computer.

The functions of the modules described can naturally be realized completely or partially by corresponding algorithms via software so that the computer acts, for example directly via an analogue output, on the desired-value input $i_{soll}$ of the power module. The feedback signal $u_{Ist}$ is made accessible to the computer in this case through an analogue input.

The examples given above only show some possibilities of advantageous embodiments of the idea according to the invention. Naturally, the functions of the modules can also be carried out electronically in parallel connections or other intermeshing. What is important for the invention is that the static and dynamic characteristics of the source are produced by electronic switching circuits which control one or more power units. Modules which can be called up through switching functions and which accommodate different characteristics are likewise also conceivable, and the calling up may be effected, for example on request by the process itself.

The following advantages result from the invention described above:

(1) The source can be adjusted freely with regard to its static and dynamic behaviour.

(2) All characteristics can be altered and optimized even during the welding.

(3) All adjustments are reproducible and transmittable.

(4) The source characteristics adjusted are completely independent of the driving mains.

(5) Process-controlled choke effects with different rise and fall behaviour can be achieved.

(6) For the MIG-MAG arc pulse welding, pulses can be produced with characteristics which lead either to a hard, driving or to a soft, non-driving arc.

(7) By optimizing the reaction speeds of the dynamic module, the arc noise, which has a disturbing effect at higher pulse frequencies, can be reduced to a minimum.

(8) During MIG-MAG pulses, the basic current can be lowered to the limit for the process stability.

(9) All parameters for pulse welding can be selected freely and are not dependent on the mains.

(10) Through detector action of the static module, a high process stability results during the MIG-MAG pulses both during the welding and also in the ignition phase.

(11) A minimum current which can be preset during MIG-MAG and submerged arc welding increases the stability of the process.

(12) Asymmetrical choke action leads to a reduction in spattering during the restriking of the arc after a material bridge.

(13) All welding programs can be controlled and stored through computers.

(14) The characteristic modules can control a plurality of power modules connected in parallel for processes with high current strengths. In this case, there are no current distribution problems if the power modules work as constant current sources.

(15) The electronic welding energy source can be operated excellently through batteries.

With regard to the description and FIGS. 2, 3, 6 and 7, not all the supply and auxiliary voltages for the electronic switching circuits have been shown so as to bring out clearly the idea of the invention which relates to the course of the signals and the signal processing.

We claim:

1. An electronic control system for controlling the energization current for an arc welding process in accordance with variations in static and dynamic operational welding conditions, comprising:

a power circuit connecting a power supply to an arc welding apparatus, the power circuit including signal-actuated high speed solid state current varying means for varying the current supplied to the welding apparatus from the power supply;

static signal means for generating a static function signal indicative of a given operational condition for the welding process, the static signal means comprising comparator means for comparing the amplitude of a first operating parameter of the welding process with a first reference signal representative of a predetermined level for said operational condition;

dynamic signal means for modifying the static function signal in accordance with a predetermined time/amplitude function to generate a dynamic function signal which varies in accordance with both static and dynamic operational conditions of the welding process, the dynamic signal means comprising two oppositely polarized parallel connected integrator circuits each including an adjustable impedance to vary the integration time constants for signals of increasing and decreasing amplitude independently of each other;

and control means for utilizing the dynamic function signal to actuate the current varying means in the power circuit and thereby control the current supplied to the welding apparatus.

2. An electronic control system for arc welding, according to claim 1, in which the control means comprises a comparator for comparing the dynamic function signal with a second operating parameter of the welding process to develop a switch actuation signal that is applied to the power circuit current varying means.

3. An electronic control system for arc welding, according to claim 1, in which the first operating parameter is the power input voltage to the welding process, the first reference signal is a reference voltage, and the second operating parameter is the power input current to the welding process.

4. An electronic control system for arc welding, according to claim 1, in which the static signal means includes supplemental reference signal means for maintaining the static signal at a preset minimum threshold value independently of the output of the comparator in the static signal means.

5. A method of controlling the energization of an electrically energized arc welding process comprising the following steps:

A. comparing a signal indicative of the power input voltage of the welding process with a reference signal to develop a static function signal;

B. modifying the static function signal by integration over a predetermined time period to develop a dynamic function signal which varies in accordance with both dynamic and static conditions of the welding process,
    step B being carried out via circuit means affording independently adjustable time constants for signals of increasing and decreasing amplitude; and C. varying the current supplied to the welding process as a function of the dynamic function signal;
    step C being carried out via the following substeps:

C1. comparing the dynamic function signal with a signal indicative of the power input current of the welding process to develop a current control signal; and C2. varying the current supplied to the welding process as a function of the current control signal.

6. A method of controlling energization of an arc welding process according to claim 5 in which, in step A, the static function signal is maintained at or above a given minimum threshold level.

* * * * *